United States Patent [19]

Takahashi et al.

[11] Patent Number: 5,724,651
[45] Date of Patent: Mar. 3, 1998

[54] METHOD AND APPARATUS FOR CHECKING A POWER SUPPLY IN A RADIO RECEIVER

[75] Inventors: Satoshi Takahashi; Masahiro Matai, both of Tokyo, Japan

[73] Assignee: NEC Corporation, Japan

[21] Appl. No.: 506,846

[22] Filed: Jul. 25, 1995

[30] Foreign Application Priority Data

Jul. 25, 1994 [JP] Japan ................................ 6-192816

[51] Int. Cl.⁶ .................................................. H04B 17/00
[52] U.S. Cl. .................... 455/226.4; 455/38.3; 455/67.7; 455/343
[58] Field of Search ................................ 455/38.1–38.4, 455/67.1, 67.7, 226.1–226.2, 226.4, 343, 89, 231, 575, 572, 574; 340/825.44, 311.1

[56] References Cited

U.S. PATENT DOCUMENTS 5,095,308   3/1992   Hewitt .
5,473,319  12/1995   Asai .......................................... 455/38.3
5,530,911   6/1996   Lerner et al. ............................ 455/343

FOREIGN PATENT DOCUMENTS

0330514   8/1989   European Pat. Off. .

*Primary Examiner*—Nguyen Vo
*Attorney, Agent, or Firm*—Ostrolenk, Faber, Gerb & Soffen, LLP

[57] ABSTRACT

In a radio receiver comprising a battery, a local oscillator, a mixer, a demodulator and a controller, a voltage level of the battery is detected within the rise time of the local oscillator after the power is supplied thereto. The power is intermittently supplied to the local oscillator and other circuits. Before the rise of the local oscillator, the voltage level is selected to check the battery. After the rise of the local oscillator, the demodulated signal is selected to perform usual receiving operation. The rise of the local oscillator is detected by comparing an amplitude of the intermediate frequency signal with a reference value. The voltage level and the demodulated signal are transferred to the controller through a single port.

30 Claims, 6 Drawing Sheets

METHOD AND APPARATUS FOR CHECKING A POWER SUPPLY IN A RADIO RECEIVER

BACKGROUND OF THE INVENTION

1. Field of the Invention

The present invention relates to a radio receiver, and particularly to a radio receiver having a function of checking a power supply.

2. Prior Art

In general, a battery-powered receiver is provided with a battery checking function which informs a user of the reduction of the power-supply voltage by alarm sound before the battery goes dead. An example of the radio receiver having such a function is shown in FIG. 1.

Figure 1:
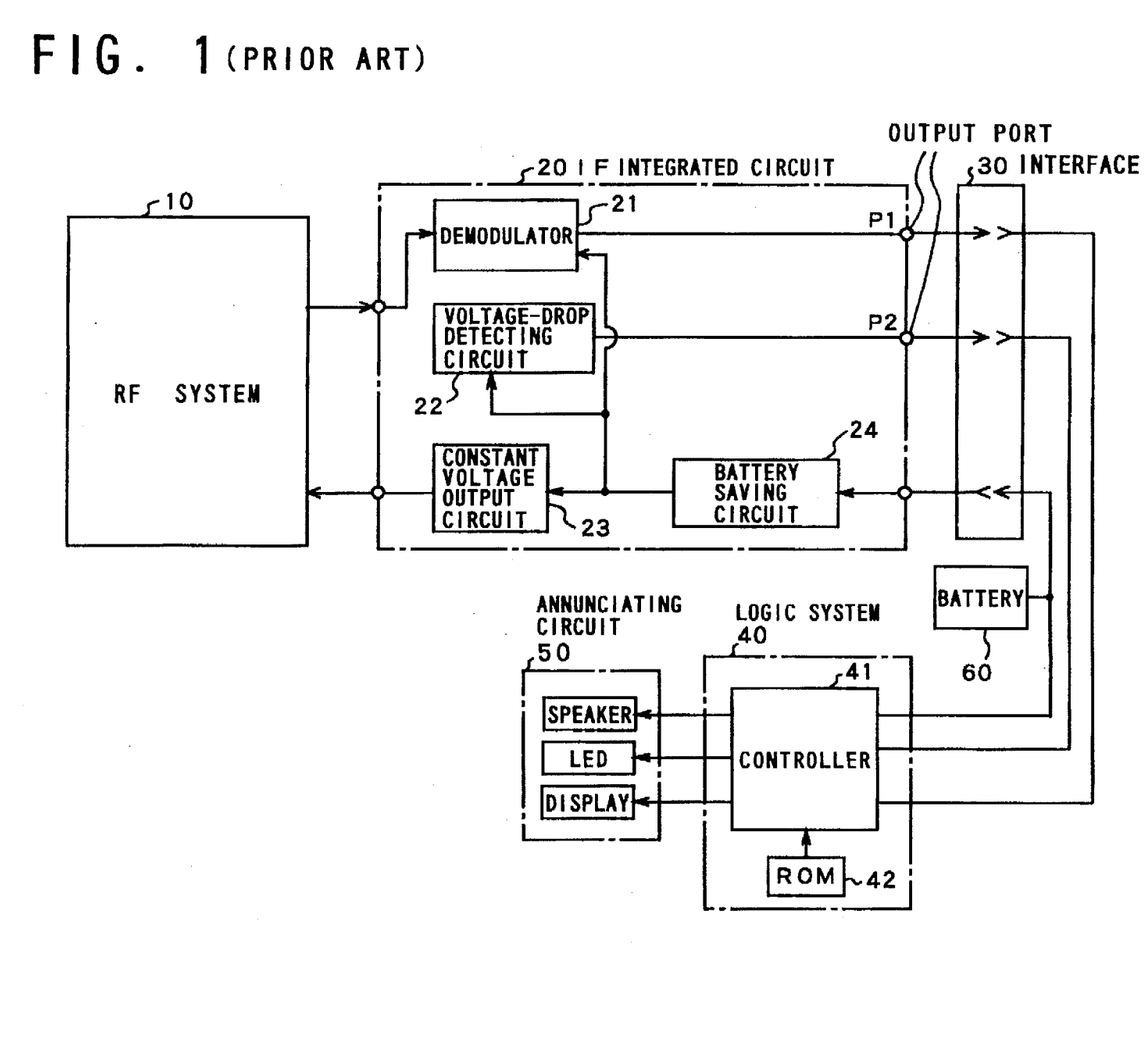
FIG. 1 is a block diagram showing an example of a conventional selective calling receiver.

Referring to FIG. 1, a radio frequency (RF) system 10 receives a RF signal and converts it to an intermediate frequency (IF) signal. Receiving the IF signal, an IF system 20 demodulates digital data from the IF signal and transfers it to a logic system 40 through an interface 30. The logic system 40 processes the demodulated data and controls an annunciating circuit 50 which informs a user of an incoming call and battery consumption. A battery 60 supplies power to all the circuits of the receiver. The interface 30 is a connector which connects a print-circuit board incorporating the RF system 10 and the IF system 20 with a print-circuit board incorporating the logic system 40, which contributes to miniaturization of the receiver.

The RF system 10 converts the received RF signal into an IF signal by frequency mixing and outputs it to the IF system 20. Therefore, the IF system 20 usually manages a signal of a constant intermediate frequency regardless of the received RF frequency. For this reason, the IF system 20 is usually formed with an integrated circuit.

The IF system 20 is comprised of the following circuits: a demodulator 21 for demodulating the data from the IF signal, a voltage-drop detecting circuit 22 for detecting a voltage reduction of the battery 60, a constant voltage output circuit 23 for supplying power to the RF system 100 stably, and a battery saving circuit 24 for increasing the battery life.

The demodulated data is transferred to the controller 41 of the logic system 40 through an output port P1 of the IF system 20 and the interface 30. The logic system 40 detects a calling signal from the demodulated data. If the calling signal is addressed to the receiver itself, the controller 41 causes the annunciating circuit 50 to work so as to inform a user of an incoming call.

By switching the power supplying to the RF system 10 and the IF system 20 on and off, the battery saving circuit 24 provides so-called intermittent receiving. When a voltage of the battery 60 becomes less the required level, the voltage-drop detecting circuit 22 outputs a detection signal to the controller 41 through an output port P2 of the IF system 20. According to the detection signal, the controller 41 causes the annunciating circuit 50 to work so as to inform a user of a voltage reduction of the battery 60.

However, for the selective call receiver mentioned above, it is necessary to provide two output ports P1 and P2 separately to transfer the demodulated data of the demodulator 21 and the detection signal of the voltage-drop detection circuit 22 to the logic system 40. Since the number of output ports in an integrated circuit determines the physical dimensions of its package, the increased number of the output ports provides a main obstacle to reduction in scale of a mounting area of the package. In addition, with the increasing number of the ports of the IF system 20, the number of ports of the interface (connector) 30 is naturally increased. These make a rise of the manufacturing cost and further cause the reliability of an integrated circuit to be reduced.

SUMMARY OF THE INVENTION

An object of the present invention is to provide a method and an apparatus of checking a power supply of a radio receiver with a simple structure and a reduced mounting area.

Another object of the present invention is to provide a radio receiver having a function of checking a power supply which is implemented with simple interconnections and a smaller mounting area.

Still another object of the present invention is to provide a radio receiver which provides the smaller number of ports for connecting a high-frequency system and a control system.

The present invention utilizes the phenomenon that the rise of an oscillator circuit is delayed from that of a comparator circuit when the power is supplied to them simultaneously. More specifically, a rise time of the local oscillator is longer than that of the voltage-drop detecting circuit. A power-supply voltage is checked within the delay period or the rise time difference before a receiving operation is performed. By monitoring a level of the intermediate frequency signal generated by a mixer, the start-up of the local oscillator is detected. After the local oscillator has started working in a steady state, a usual receiving operation is performed using the demodulated data.

According to the present invention, the power is intermittently supplied to the local oscillator and other circuits. A voltage level of the power supply is detected within a predetermined time period after the power is supplied to the local oscillator. The predetermined time period is determined in advance based on a rise time of the local oscillator. The power-supply checking is performed based on the voltage level of the power supply.

More specifically, the voltage level is detected by comparing a power-supply voltage with a predetermined reference voltage. The voltage level is selected within the predetermined time period after the power is supplied to the local oscillator. After the rise of the local oscillator is detected, the demodulated data is selected to perform the usual receiving operation. Since one signal is selected from the demodulated data and the voltage level depending on whether the rise of the local oscillator is detected after the power is supplied to the local oscillator, only one port is needed for transfer to the controller.

Preferably, the rise of the local oscillator is detected by comparing an amplitude of the intermediate frequency signal with a reference value.

DETAILED DESCRIPTION OF THE PREFERRED EMBODIMENTS

Figure 2:
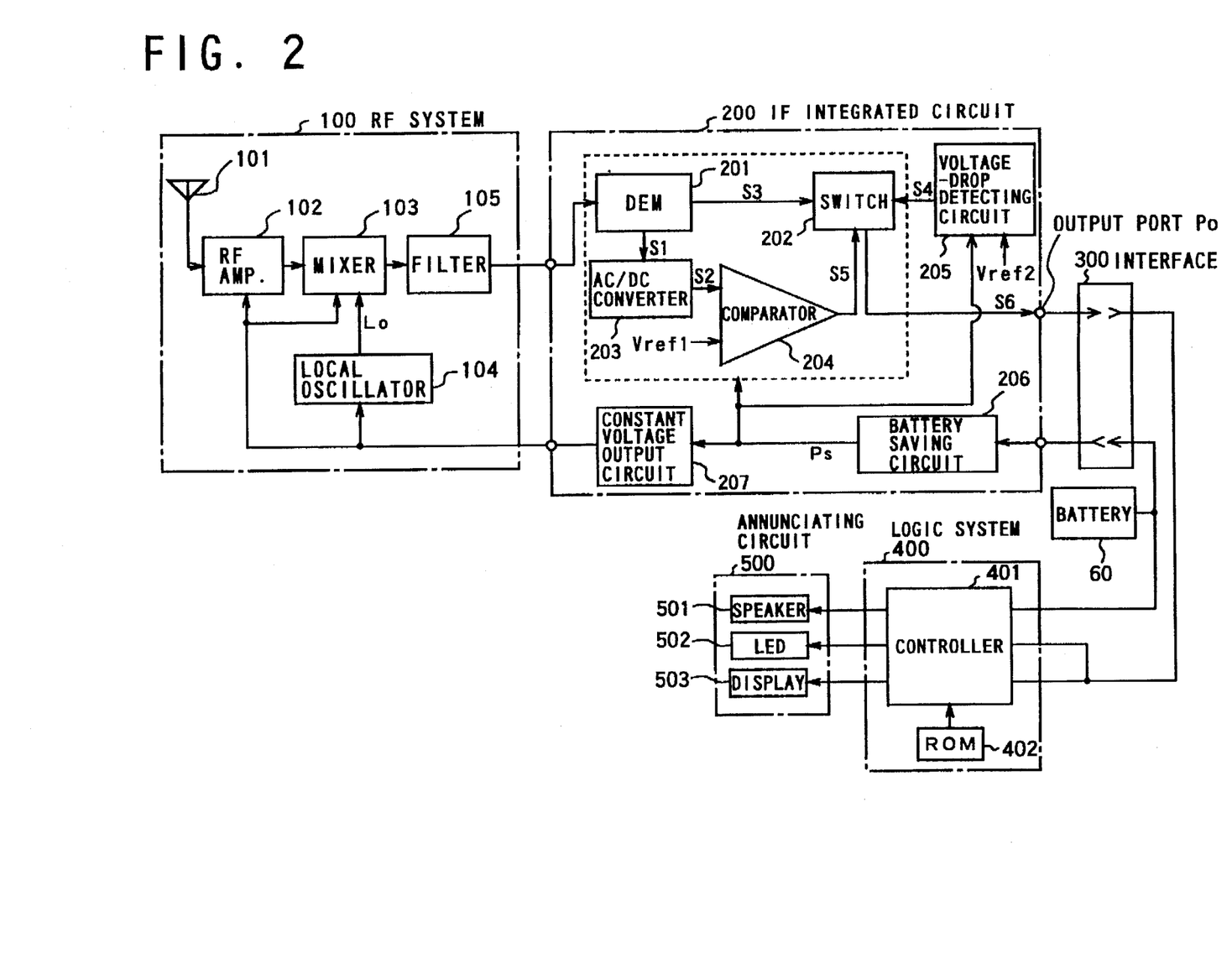
FIG. 2 is a block diagram showing an embodiment of a selective calling receiver according to the present invention.

Referring to FIG. 2, a selective calling receiver is mainly comprised of RF system 100, IF integrated circuit 200, interface 300, logical system 400, annunciating circuit 500, and battery 60. In the RF system 100, a Frequency Modulation (FM) wave received by a receiving antenna 101 is amplified by a RF amplifier 102. A mixer 103 converts the received FM signal to a FM signal of an intermediate frequency (IF) by mixing the received FM frequency with a local oscillating frequency Lo which is generated by a local oscillator 104.

The local oscillator 104 is comprised of a well-known oscillator such as a PLL (phase locked loop) oscillator or a Colpitts oscillator. Such an oscillator, in general, has a rise time on the order of milliseconds. For example, a PLL oscillator has a rise time of about 25 milliseconds.

The FM signal of the intermediate frequency is transferred from the mixer 103 to the IF integrated circuit 200 through a filter 105. The IF integrated circuit 200 is comprised of a demodulator 201 which demodulates received data S3 from the received FM signal of the intermediate frequency. The demodulator 201 outputs the received data S3 to a switch 202 while supplying the received FM signal S1 to an AC/DC converter 203. By rectifying the received FM signal S1, the AC/DC converter 203 converts it to a signal S2 the amplitude of which varies in accordance with the star-up of local oscillation, and outputs it to a comparator 204.

The comparator 204 compares the signal S2 with a reference voltage $V_{ref1}$ to output the comparison result S5 as a control signal to the switch 202. The reference voltage $V_{ref1}$ may be supplied to the comparator 204 by another battery. The output S5 of the comparator 204 is 1 (a high-level voltage) when the local oscillator 104 is generating the local oscillating frequency Lo, and is 0 (a low-level voltage) at other times.

The voltage-drop detecting circuit 205 checks the output voltage Ps of the battery saving circuit 206 and outputs the detection signal S4 to the switch 202. The voltage-drop detecting circuit 205 may be comprised of a comparator for comparing the power-supply voltage Ps with a predetermined reference voltage $V_{ref2}$.

The switch 202 selects one of the received data S3 of the demodulator 201 and the detection signal S4 of the voltage-drop detecting circuit 205 according to the comparison result S5 of the comparator 204. The selected signal S6 is transferred from the output port Po of the IF integrated circuit 200 to the logic system 400 through the interface 300.

The battery saving circuit 206 is a power-supply control circuit which saves power consumption by switching the power on and off intermittently under saving-on/off control of the logic system 400. The battery saving circuit 206 supplies power to the RF system 100 and the IF integrated circuit 200 in a saving-off state and stops supplying power in a saving-on state.

A constant voltage output circuit 207 inputs the power-supply voltage Ps of the battery saving circuit 206 and supplies a constant voltage to the RF amplifier 102 and the local oscillator 104 of the RF system 100. Power is supplied to the RF system 100 and the IF integrated circuit 200 when the battery saving circuit 206 turns out to be in saving-off.

As described before, a rise time of the voltage-drop detecting circuit 205 is shorter than that of the local oscillator 104. Therefore, the voltage-drop detecting circuit 205 is capable of detecting a power-supply voltage before the local oscillator 104 generates the local oscillating wave Lo in a steady state. The steady oscillation of the local oscillator 104 is detected by the comparator 204 outputting the detection signal S5 of a high-level voltage, which causes the switch 202 to select the received data S3 of the demodulator 201. In other words, the switch 202 selects the voltage-drop detection signal S4 until the local oscillator 104 reaches a steady oscillation state. Upon detection of the steady oscillation of the local oscillator 104, the comparator 204 causes the switch 202 to select the received data S3 of the demodulator 201.

The logical system 400 is comprised of a controller 401 and a read-only memory (ROM) 402 which stores the ID number of the selective calling receiver itself. The controller 401 controls the receiving operation of the selective calling receiver. When the address of the received data is coincident with the ID number, the controller 401 operates a speaker 501, a LED (Light-emitting Diode) 502 and a display 503 of the annunciating circuit 500 to inform the user of an incoming call. In cases where the voltage-drop detection signal S4 is selected by the switch 202, the controller 401 determines whether a voltage drop of the battery 60 occurs by referring to the voltage-drop detection signal S4. When the battery voltage has been reduced, the controller 401 outputs an alarm signal to the annunciating circuit 500 to operate the speaker 501, the LED 502 and the display 503.

Figure 3:
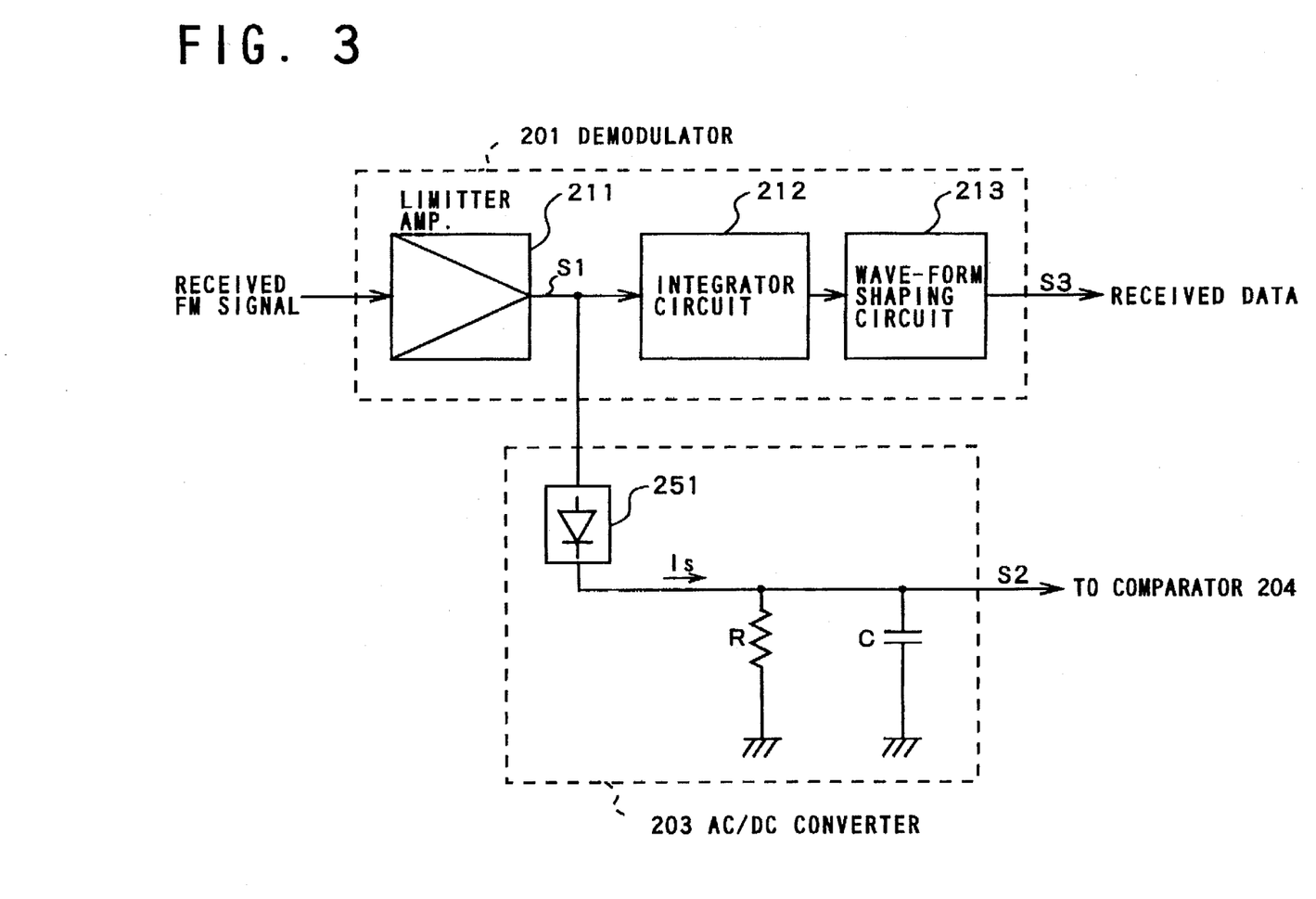
FIG. 3 is a more detailed circuit diagram of a demodulator and an AC/DC converter in the embodiment.

FIG. 3 shows an example of a circuit configuration of the demodulator 201 and the AC/DC converter 203. The demodulator 201 is comprised of a limiter amplifier 211 which amplifies the amplitude of the intermediate frequency FM signal up to the saturation point, an integrating circuit 212 which converts the FM signal to a direct current signal changing in voltage, and a wave-shaping circuit 213.

The AC/DC converter 203 is comprised of a rectifying circuit which performs half-wave rectification of the output S1 of the limiter amplifier 211. The rectifying circuit is comprised of a rectifier 251 and a low-pass filter which is comprised of a resistor R and a capacitor C. The output S2 of the AC/DC converter 203 is a signal indicating the start-up of the local oscillator 104 as described in detail hereinafter.

Figure 4:
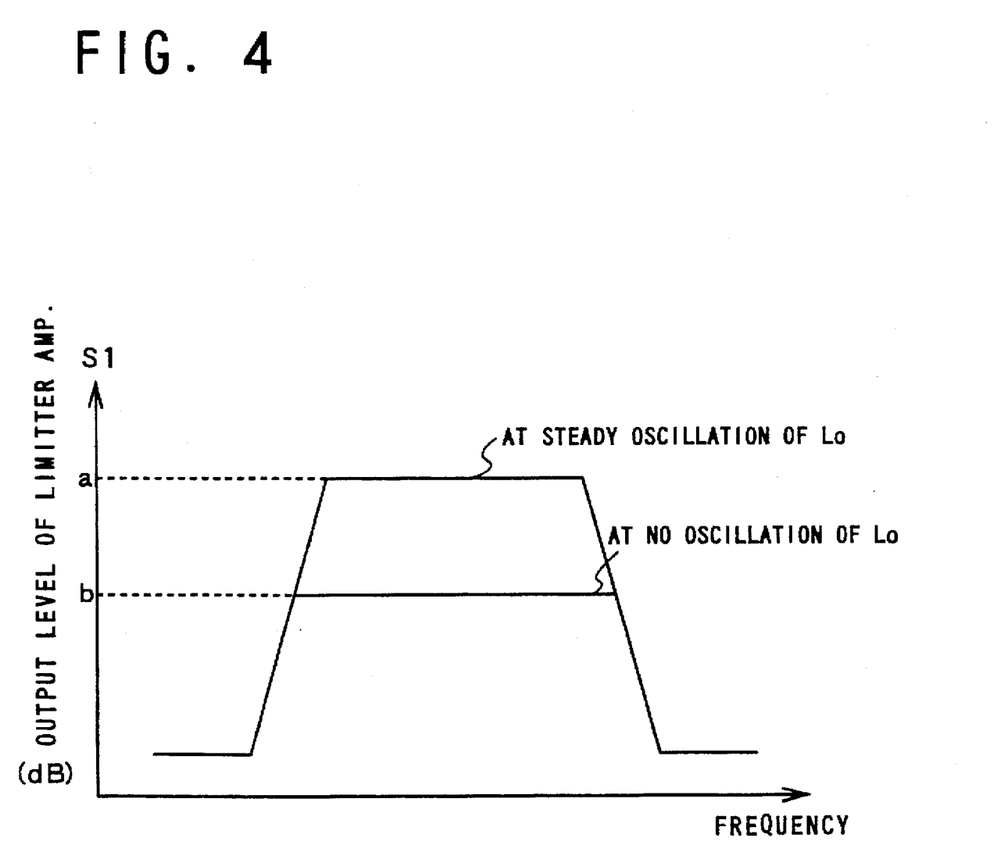
FIG. 4 is a graph showing a level change of an output S1 of a limiter amplifier in accordance with the operation state of a local oscillator.

As shown in FIG. 4, the limiter amplifier 211 outputs a signal S1 of a high level (a) at steady oscillation of the local oscillator 104 and outputs a signal S1 of a low level (b) at no oscillation of the local oscillator 104. The reason is as follows. When the local oscillating frequency Lo is not mixed with the received wave, the mixer 103 of the RF system 100 generates an intermediate frequency FM signal of a relatively small amplitude. However, when the local oscillating frequency Lo is mixed, the mixer 103 generates an intermediate frequency FM signal of a relatively large amplitude. In other words, the limiter amplifier 211 generates the signal S1(a) of a saturated amplitude at the steady oscillation of the local oscillator 104 even though no received wave is input to the mixer 103. Reversely, an amplitude of the output S1 of the limiter amplifier 211 decreases to the unsaturated level (b) when the local oscillator 104 stops working.

Figure 5:
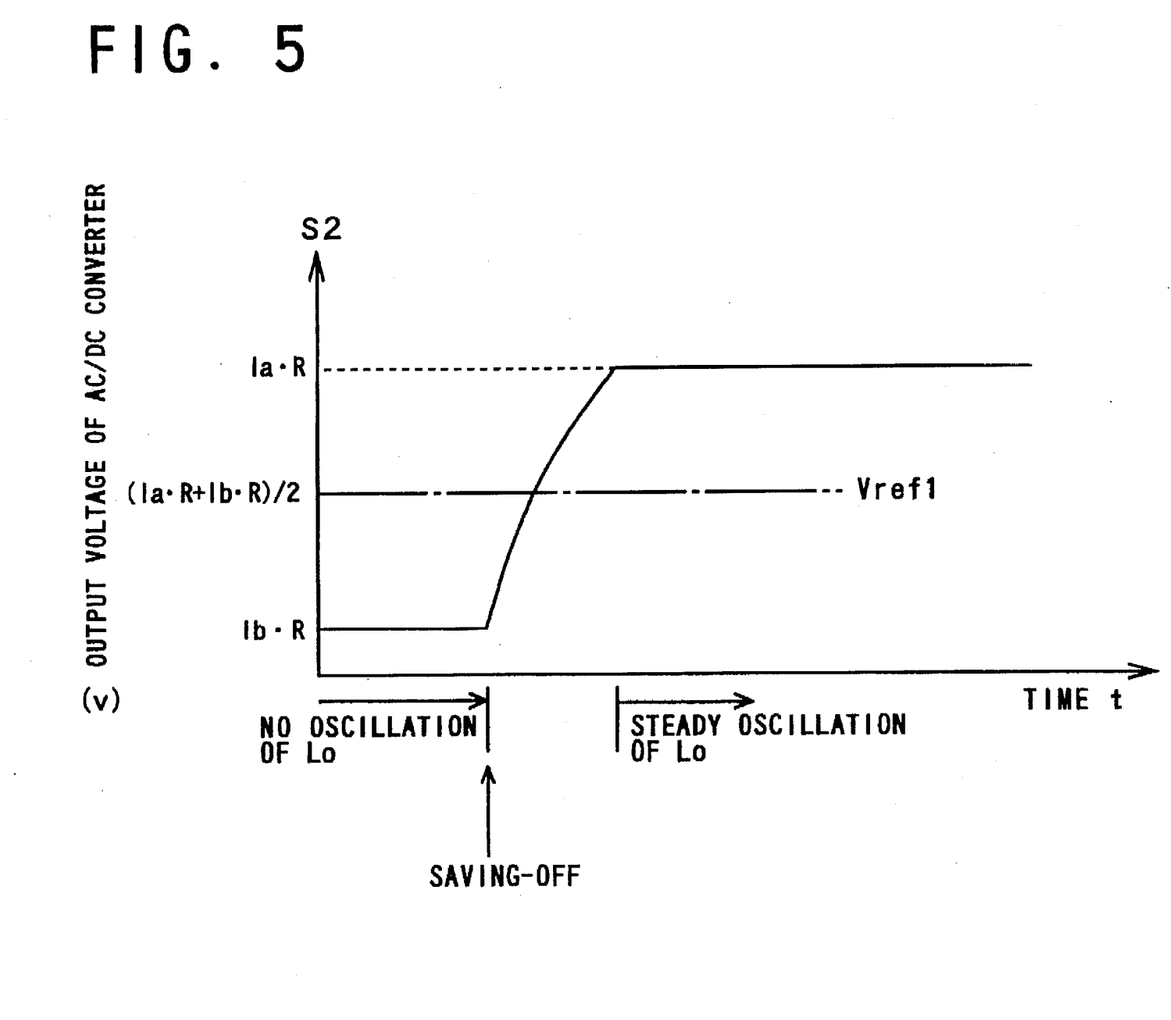
FIG. 5 is a graph showing a voltage change of an output S2 of the AC/DC converter when the local oscillator starts working.

As illustrated in FIG. 5, the output S2 of the AC/DC converter 203 varies in amplitude when the local oscillator 104 starts working. The current Is flowing through the rectifier 251 of the AC/DC converter 203 is of a smaller value (Ib) when the local oscillator 104 generates no local oscillating signal. On the other hand, the current Is is of a larger value (Ia) when the local oscillator 104 is in a steady oscillation state. Therefore, when a state of local oscillator 104 changes from non-operation to operation, the output voltage S2 of the AC/DC converter 203 also changes from a low voltage level (IbR) to a high voltage level (IaR) as shown in FIG. 5. In order to discriminate between these two voltage levels (IbR) and (IaR), the reference voltage $V_{ref1}$ of (IaR+IbR)/2 is given to the comparator 204. Therefore, when receiving the signal S2 of a low voltage level (IbR) from the AC/DC converter 203, the comparator 204 outputs the detection signal S5 of a low-level voltage to the switch 202 which selects the detection signal S4 of the voltage-drop detecting circuit 205. When receiving the signal S2 of a high voltage level (IaR) from the AC/DC converter 203, the comparator 204 outputs the detection signal S5 of a high-level voltage to the switch 202 which selects the demodulated data S3 of the demodulator 201. The signal S6 selected in such a way is transferred from the output port Po of the IF integrated circuit 200 to the controller 401 of the logic system 400 through the interface 300.

By designing in this way, the received data S3 and the detection signal S4 are successively output to the logical system 400 through the single output port Po, which contributes to miniaturization of the IF integrated circuit 200 and the interface 300.

Detection Timing of Power-Supply Voltage

Figure 6:
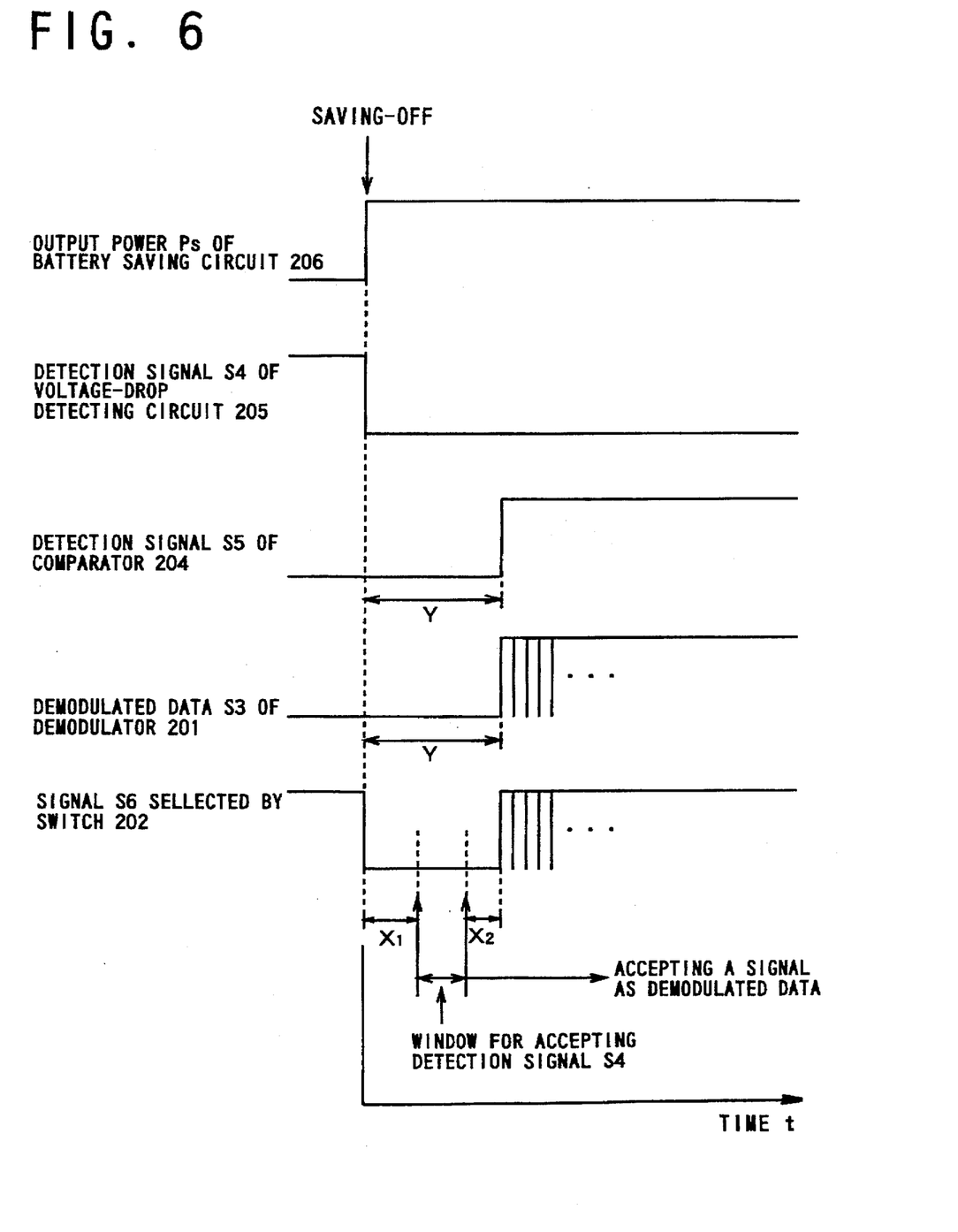
FIG. 6 is a time chart showing a power-supply voltage checking method according to an embodiment of the present invention.

As shown in FIG. 6, when the controller 401 causes the battery saving circuit 206 to turn into saving-off, the power-supply voltage Ps is supplied from the battery saving circuit 206 to the RF system 100 and the IF integrated circuit 200. Since the voltage-drop detecting circuit 205 is a comparator, the voltage detection signal S4 is output to the switch 202 almost simultaneously with the timing of saving-off. Note that FIG. 6 shows the detection signal S4 at the time when the battery 60 leaves sufficient power.

However, a rise time Y of several milliseconds is needed for steady oscillation of the local oscillator 104 of the RF system 100. During this time period Y, the demodulator 201 outputs no data to the switch 202 and supplies the signal S1(b) of the low level to the AC/DC converter 203 (See FIG. 4). Therefore, the comparator 204 outputs the detection signal S5 of 0 to the switch 202. The detection signal S5 of 0 causes the switch 202 to select the detection signal S4 of the voltage-drop detecting circuit 205. This detection signal S4 is transferred as a signal S6 from the output port Po of the IF integrated circuit 200 to the controller 401 of the logic system 400 through the interface 300. In this way, a voltage-drop detection of the battery 60 is performed during the time period Y.

After the time period Y has passed, the local oscillator 104 generates a steady local oscillating frequency Lo which is mixed with a received wave by the mixer 103. This causes the demodulator 201 to output the demodulated data S3 to the switch 202 and to output the signal S1(a) of a high-level voltage to the AC/DC converter 203. Receiving a high-level signal S2 from the AC/DC converter 203, the comparator 204 also outputs the detection signal S5 of 1 to the switch 202. The detection signal S5 of 1 causes the switch 202 to select the demodulated data S3 of the demodulator 201 and transfers it to the controller 401 through the output port Po and the interface 300.

In this way, the detection signal S4 is transferred to the logic system 400 through the output port Po during the time period Y associated with the rise time of the local oscillator 104, and after a lapse of the period time Y, the demodulated data S3 is transferred to the logic system 40 through the same port Po.

In a practical case, there are some variations in the rise time Y of the local oscillator 104, which are about ±1 msec in general. In order to accommodate such variations, the controller 401 sets up a window to accept the detection signal S4 within the time period Y. More specifically, the window is a time slot which is formed by removing a first margin of $X_1$ (milliseconds) and a second margin of $X_2$ (milliseconds) from the time period Y, as shown in FIG. 6. The controller 401 accepts the detection signal S4 of the voltage-drop detecting circuit 205 through the window and determines whether a voltage drop occurs in the battery 60.

As described above, each time the battery saving circuit 206 supplies power to the RF system 100 and the IF integrated circuit 200, the battery check is performed at first through the voltage-drop detecting circuit 205. Since the voltage-drop detecting circuit 205 is operated only for the time period Y, the power consumption is further reduced.

In addition, a voltage-drop detection period and a receiving operation period are successively provided on a time axis, and one of the voltage-drop detection signal S4 and the demodulated data S3 is selected by the switch 202 to be transferred to the logic system 400. Therefore, a single output port Po is shared for transferring the voltage-drop detection signal S4 and the demodulated data S3, which contributes to miniaturization of the selective calling receiver.

What is claimed is:

1. A method for checking a power supply in a radio receiver, the radio receiver comprising a local oscillator for generating a local oscillating signal which is to be mixed with a radio-frequency signal, the method comprising the steps of:
   a) supplying power to the local oscillator intermittently;
   b) detecting a voltage level of the power supply within a predetermined time period after the power is supplied to the local oscillator, the predetermined time period being determined in advance based on a rise time of the local oscillator; and
   c) checking the power supply based on the voltage level.

2. The method according to claim 1, wherein the step (b) comprises:
   comparing a power-supply voltage with a predetermined reference voltage to generate the voltage level; and
   accepting the voltage level within the predetermined time period after the power is supplied to the local oscillator.

3. The method according to claim 1, further comprising the steps of:
   demodulating a received signal from an intermediate frequency signal which is obtained by mixing the radio-frequency signal with the local oscillating signal; and
   detecting a rise of the local oscillator,
   wherein the step (b) comprises the steps of:
   comparing a power-supply voltage with a predetermined reference voltage to generate the voltage level;
   selecting the voltage level from the received signal and the voltage level within the predetermined time period after the power is supplied to the local oscillator; and
   selecting the received signal from the received signal and the voltage level after the rise of the local oscillator is detected.

4. The method according to claim 1, wherein the step (c) comprises a step of annunciating a voltage-drop of the power supply.

5. A method for checking a power supply in a radio receiver, the radio receiver comprising:

a local oscillator for generating a local oscillating signal;

a mixer for mixing a radio-frequency signal with the local oscillating signal to generate an intermediate frequency signal;

a demodulator for demodulating a baseband signal from the intermediate frequency signal; and a controller for controlling a receiving operation of the radio receiver, the method comprising the steps of:

a) supplying power to the local oscillator intermittently;

b) detecting a voltage level of the power supply;

c) detecting a rise of the local oscillator;

d) selecting a single signal from the baseband signal and the power-supply voltage depending on whether the rise of the local oscillator is detected after the power is supplied to the local oscillator;

e) transferring the single signal to the controller;

f) checking the power supply based on the single signal before the rise of the local oscillator is detected; and g) performing the receiving operation based on the single signal after the rise of the local oscillator is detected.

6. The method according to claim 5, wherein the step (b) comprises a step of comparing a power-supply voltage with a predetermined reference voltage to generate the voltage level.

7. The method according to claim 5, wherein the step (c) comprises the steps of:

detecting an amplitude of the intermediate frequency signal; and comparing the amplitude with a predetermined reference value.

8. The method according to claim 7, wherein the step (d) comprises:

selecting the voltage level when the amplitude is smaller than the predetermined reference value; and selecting the baseband signal when the amplitude is not smaller than the predetermined reference value.

9. The method according to claim 5, wherein the step (d) comprises:

selecting the voltage level within a predetermined time period after the power is supplied to the local oscillator; and selecting the baseband signal after the rise of the local oscillator is detected.

10. The method according to claim 5, wherein the step (f) comprises a step of annunciating a voltage-drop of the power supply.

11. An apparatus for checking a power supply in a radio receiver, the radio receiver comprising a local oscillator for generating a local oscillating signal which is to be mixed with a radio-frequency signal, the apparatus comprising:

power supplying means for supplying power to the local oscillator intermittently;

first detecting means for detecting a voltage level of the power supply within a predetermined time period after the power is supplied to the local oscillator, the predetermined time period being determined in advance based on a rise time of the local oscillator; and checking means for checking the power supply based on the voltage level.

12. The apparatus according to claim 11, wherein the first detecting means comprises:

a comparator for comparing a power-supply voltage with a predetermined reference voltage to generate the voltage level; and accepting means for accepting the voltage level within the predetermined time period after the power is supplied to the local oscillator.

13. The apparatus according to claim 11, wherein:

the radio receiver further comprises a demodulator for demodulating a received signal from an intermediate frequency signal which is obtained by mixing the radio-frequency signal with the local oscillating signal, the first detecting means comprises:

second detecting means for detecting a rise of the local oscillator, a comparator for comparing a power-supply voltage with a predetermined reference voltage to generate the voltage level;

first selecting means for selecting the voltage level from the received signal and the voltage level within the predetermined time period after the power is supplied to the local oscillator; and second selecting means for selecting the received signal from the received signal and the voltage level after the rise of the local oscillator is detected.

14. The apparatus according to claim 11, wherein the checking means comprises an annunciating circuit for annunciating a voltage-drop of the power supply.

15. A radio receiver comprising:

a local oscillator for generating a local oscillating signal;

a mixer for mixing a radio-frequency signal with the local oscillating signal to generate an intermediate frequency signal;

a demodulator for demodulating a baseband signal from the intermediate frequency signal;

power supplying means for supplying power to the local oscillator intermittently;

first detecting means for detecting a voltage level of the power supply;

second detecting means for detecting a rise of the local oscillator;

first selecting means for selecting a single signal from the baseband signal and the voltage level depending on whether the rise of the local oscillator is detected after the power is supplied to the local oscillator;

transferring means for transferring the single signal to the controller;

checking means for checking the power supply based on the single signal before the rise of the local oscillator is detected; and a controller for performing the receiving operation based on the single signal after the rise of the local oscillator is detected.

16. The radio receiver according to claim 15, wherein the first detecting means comprises a first comparator for comparing a power-supply voltage with a predetermined reference voltage to generate the voltage level.

17. The radio receiver according to claim 15, wherein the second detecting means comprises:

an amplitude detector means for detecting an amplitude of the intermediate frequency signal; and a second comparator for comparing the amplitude with a predetermined reference value.

18. The radio receiver according to claim 17, wherein the amplitude detector comprises a rectifying circuit for converting the intermediate frequency signal into a direct current signal.

19. The radio receiver according to claim 17, wherein the first selecting means selects the voltage level when the amplitude is smaller than the predetermined reference value, and selects the baseband signal when the amplitude is not smaller than the predetermined reference value.

20. The radio receiver according to claim 15, wherein the first selecting means selects the voltage level within a predetermined time period after the power is supplied to the local oscillator, and selects the baseband signal after the rise of the local oscillator is detected.

21. The radio receiver according to claim 15, comprising a selective calling receiver.

22. The radio receiver according to claim 15, comprising a battery-powered receiver.

23. A radio receiver comprising:

a power supply;

a first circuit group comprising a local oscillator and a frequency converter which converts a received signal from a radio frequency into an intermediate frequency;

a second circuit group comprising a demodulator for demodulating a baseband signal from a received signal of the intermediate frequency;

a third circuit group comprising a controller for checking the power supply; and an interface connecting between the second circuit group and the third circuit group, the second circuit group further comprising:

power supplying means for supplying power to the local oscillator intermittently;

first detecting means for detecting a voltage level of the power supply;

second detecting means for detecting a rise of the local oscillator;

first selecting means for selecting a single signal from the baseband signal and the voltage level depending on whether the rise of the local oscillator is detected after the power is supplied to the local oscillator; and an output port for transferring the single signal to the controller of the third circuit group.

24. The radio receiver according to claim 23, wherein the first detecting means comprises a first comparator for comparing a power-supply voltage with a predetermined reference voltage to generate the voltage level.

25. The radio receiver according to claim 23, wherein the second detecting means comprises:

an amplitude detector means for detecting an amplitude of the received signal of the intermediate frequency; and a second comparator for comparing the amplitude with a predetermined reference value.

26. The radio receiver according to claim 25, wherein the amplitude detector comprises a rectifying circuit for converting the received signal of the intermediate frequency into a direct current signal.

27. The radio receiver according to claim 25, wherein the first selecting means selects the voltage level when the amplitude is smaller than the predetermined reference value, and selects the baseband signal when the amplitude is not smaller than the predetermined reference value.

28. The radio receiver according to claim 23, wherein the first selecting means selects the voltage level within a predetermined time period after the power is supplied to the local oscillator, and selects the baseband signal after the rise of the local oscillator is detected.

29. The radio receiver according to claim 23, comprising a selective calling receiver.

30. The radio receiver according to claim 23, comprising a battery-powered receiver.

* * * * *